US011230260B2

(12) United States Patent
Ahmed et al.

(10) Patent No.: US 11,230,260 B2
(45) Date of Patent: Jan. 25, 2022

(54) ADAPTIVE BLE AND UWB BASED CONNECTION RATE CONTROL FOR MOBILE ACCESS DEVICES OF VEHICULAR PASSIVE ACCESS SYSTEMS

(71) Applicants: DENSO International America, Inc., Southfield, MI (US); DENSO CORPORATION, Kariya (JP)

(72) Inventors: Osman Ahmed, Bloomfield Hills, MI (US); Yuki Tokunaga, Kariya (JP)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/913,627

(22) Filed: Jun. 26, 2020

(65) Prior Publication Data

US 2021/0402955 A1    Dec. 30, 2021

(51) Int. Cl.
| | |
|---|---|
| *G05B 19/00* | (2006.01) |
| *G05B 23/00* | (2006.01) |
| *G06F 7/00* | (2006.01) |
| *G06F 7/04* | (2006.01) |
| *G06K 19/00* | (2006.01) |
| *G08B 29/00* | (2006.01) |
| *H04B 1/00* | (2006.01) |

(Continued)

(52) U.S. Cl.
CPC .......... *B60R 25/245* (2013.01); *B60R 25/01* (2013.01); *H04W 4/023* (2013.01); *H04W 4/80* (2018.02); *B60R 2325/10* (2013.01); *H04B 1/38* (2013.01); *H04W 12/06* (2013.01)

(58) Field of Classification Search
CPC ... B60R 25/245; B60R 25/01; B60R 2325/10; H04W 4/80; H04W 4/023; H04W 12/06; H04B 1/38
USPC ....................................................... 340/5.61
See application file for complete search history.

(56) References Cited

U.S. PATENT DOCUMENTS 9,688,247 B1   6/2017 Jayaraman et al.
9,794,753 B1   10/2017 Stitt et al.
(Continued)

FOREIGN PATENT DOCUMENTS

BR   102014017465 A2   2/2016
CN   104574593 A        4/2015
(Continued)

*Primary Examiner* — Tanmay K Shah
(74) *Attorney, Agent, or Firm* — Harness, Dickey & Pierce, P.L.C.

(57) ABSTRACT

A mobile access device includes a transceiver and a control module. The transceiver transmits and receives ultra-wideband signals including a first challenge signal. The control module: transmits via the transceiver the first challenge signal to a vehicle, where the first challenge signal is associated with a passive entry or a passive start operation of the vehicle, based on the first challenge signal, receive a response signal from the vehicle, determine a distance between the mobile access device and the vehicle based on the response signal, determine a wait period based on the distance, wait a minimum period, where the minimum period is a minimum of (i) the wait period and (ii) an advertisement period or a predetermined ranging period, and subsequent to waiting the minimum period, transmit a second challenge signal to the vehicle to update the distance between the mobile access device and the vehicle.

29 Claims, 11 Drawing Sheets

(51) Int. Cl.
   *G08C 19/00*     (2006.01)
   *H04B 1/38*      (2015.01)
   *H04B 3/00*      (2006.01)
   *H04Q 1/00*      (2006.01)
   *H04Q 9/00*      (2006.01)
   *B60R 25/24*     (2013.01)
   *H04W 4/02*      (2018.01)
   *H04W 4/80*      (2018.01)
   *B60R 25/01*     (2013.01)
   *H04W 12/06*     (2021.01)

(56) References Cited

U.S. PATENT DOCUMENTS

| | | |
|---|---|---|
| 9,894,492 B1 | 2/2018 | Elangovan et al. |
| 10,002,479 B2 | 6/2018 | Oz et al. |
| 10,244,476 B2 | 3/2019 | Elangovan et al. |
| 10,328,898 B2 | 6/2019 | Golsch et al. |
| 10,328,899 B2 | 6/2019 | Golsch |
| 10,328,900 B1 | 6/2019 | Yakovenko et al. |
| 2011/0215921 A1 | 9/2011 | Ben Ayed et al. |
| 2012/0045058 A1 | 2/2012 | Weghaus |
| 2014/0274013 A1 | 9/2014 | Santavicca |
| 2014/0285319 A1* | 9/2014 | Khan ............... G07C 9/00 340/5.61 |
| 2015/0148989 A1 | 5/2015 | Cooper et al. |
| 2015/0161832 A1 | 6/2015 | Esselink et al. |
| 2015/0310681 A1 | 10/2015 | Avery et al. |
| 2015/0356797 A1 | 12/2015 | McBride et al. |
| 2016/0150407 A1 | 5/2016 | Michaud et al. |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |
| 2019/0061686 A1* | 2/2019 | Neuhoff ............... B60R 25/24 |
| 2019/0263356 A1 | 8/2019 | Golsch et al. |

FOREIGN PATENT DOCUMENTS

| | | |
|---|---|---|
| JP | 2005113417 A | 4/2005 |
| WO | WO-16156682 A1 | 10/2016 |
| WO | WO-2017181050 A1 | 10/2017 |
| WO | WO-18040641 A1 | 3/2018 |

\* cited by examiner

ADAPTIVE BLE AND UWB BASED CONNECTION RATE CONTROL FOR MOBILE ACCESS DEVICES OF VEHICULAR PASSIVE ACCESS SYSTEMS

FIELD

The present disclosure relates to passive entry/passive start systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional passive entry/passive start (PEPS) systems allow keyless entry including providing a user access to various vehicle functions if the user possesses a key fob that has been paired with an in-vehicle PEPS electronic control unit (or PEPS module). As an example, the user in possession of the key fob may approach a vehicle having the PEPS module. The key fob communicates with the PEPS module and if the key fob is authenticated, the PEPS module may unlock doors of the vehicle. The PEPS module (i) performs an authentication process to determine if the key fob is authorized to access the vehicle, and (ii) determines a location of the key fob relative to the vehicle. The authentication process may include the exchange of an encrypted password or signature. If the password or signature is correct, then the key fob is determined to be authorized. Location of the key fob may be determined based on, for example, strength of a signal received from or by the key fob. If the key fob is authenticated and is located within an authorized zone of the vehicle, then access to the interior of the vehicle is permitted without use of a traditional manual key.

As another example, the user in possession of the key fob may activate a vehicle function by pushing a button on the key fob. In response to pushing the button, the key fob communicates with the PEPS module and if the key fob is authenticated and within a predetermined distance of the vehicle, the PEPS module performs the stated function (e.g., starts the vehicle, opens a door, sets off an alarm, etc.) associated with the button pressed on the key fob. The communication performed for the two examples may include the key fob and the PEPS module performing a one-way low-frequency (LF) wake-up function and a one-way or two-way radio frequency (RF) authentication function.

A phone as a key (PAK) vehicle access system can operate similarly as the stated PEPs system, except the vehicle is accessed using a mobile phone rather than a key fob. As an example, the mobile phone can communicate with a PAK module or a telematics control unit (TCU) in the vehicle to begin an access pairing process. The mobile phone and either the PAK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party. In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

For passive entry, some user action is typically needed to initiate a process of waking up a key fob or mobile phone (referred to as portable access devices). For example, this may include a user approaching the vehicle with a portable access device and/or touching and/or pulling on a door handle. When a PEPS module or a PAK module, which are referred to as access modules, detects this behavior, the access module performs a localization process to begin searching for and waking up the key fob.

A controller of the key fob measures a LF signal level during communication with the access module. The controller determines a received signal strength indicator (RSSI) and provides the RSSI to the access module. The access module then determines a location of the key fob based on the RSSI.

A smartphone, a wearable device, and/or other smart portable network device may perform as a key fob. The smart portable network devices may enable various vehicle functions and long range distancing features, such as passive welcome lighting, distance bounding on remote parking applications, etc.

SUMMARY

A mobile access device is provided and includes one or more transceivers and a control module. The one or more transceivers are configured to transmit and receive ultra-wideband signals. The ultra-wideband signals include a first challenge signal. The control module is configured to: transmit via the one or more transceivers the first challenge signal to a vehicle, where the first challenge signal is associated with a passive entry or a passive start operation of the vehicle, based on the first challenge signal, receive a response signal from the vehicle via the one or more transceivers, determine a distance between the mobile access device and the vehicle based on the response signal, determine a wait period based on the distance, wait a minimum period, where the minimum period is a minimum of (i) the wait period and (ii) an advertisement period or a predetermined ranging period, and subsequent to waiting the minimum period, transmit a second challenge signal via the one or more transceivers to the vehicle to update the distance between the mobile access device and the vehicle.

In other features, the mobile access device enables only an ultra-wideband transceiver. The control module is configured to transmit the first challenge signal, receive the response signal and transmit the second challenge signal via the ultra-wideband transceiver.

In other features, the control module is configured to disable transmission of at least one of advertisement signals or connection signals.

In other features, the control module is not configured to transmit at least one of advertisement signals or connection signals.

In other features, the distance is a first distance. The one or more transceivers include a low frequency or near field communication transceiver and an ultra-wideband transceiver. The control module is configured to: determine a second distance between the mobile access device and the vehicle based on transmission of a low frequency or near field communication signal between the mobile access device and the vehicle; determine the wait period based on the second distance; and transmit the first challenge signal, receive the response signal and transmit the second challenge signal via the ultra-wideband transceiver.

In other features, the control module is configured to disable transmission of at least one of advertisement signals or connection signals.

In other features, the control module is not configured to transmit at least one of advertisement signals or connection signals.

In other features, the one or more transceivers include: a first transceiver configured to operate according to a first communication standard; and a second transceiver configured to operate according to a second communication standard. The control module is configured to: transmit via the first transceiver an advertisement signal to the vehicle and in response receive at least one of a connect signal or authentication signal from the vehicle to establish a connection; and when the connection is established, transmit via the second transceiver the first challenge signal to the vehicle.

In other features, the first transceiver is a Bluetooth® low energy transceiver and the second transceiver is an ultra-wideband transceiver.

In other features, the first challenge signal and the second challenge signal are range request signals. The first challenge signal indicates the distance.

In other features, the control module is configured to determine the distance between the mobile access device and vehicle based on locations of the mobile access device and the vehicle.

In other features, the control module is configured to: transmit a ping signal via the second transceiver to the vehicle; receive an acknowledgement signal from the vehicle via the second transceiver; and transmit the first challenge signal in response to receiving the acknowledgement signal.

In other features, the control module is configured to: wait a first predetermined period before transmitting the second challenge signal when the distance is greater than a first predetermined distance; and wait the wait period when the distance is less than or equal to the first predetermined distance, where the wait period is shorter than the first predetermined period.

In other features, the control module is configured to if the distance is less than a second predetermined distance, increase the minimum period when the mobile access device is approaching the vehicle and decrease the minimum period if the mobile access device is moving away from the vehicle, where the second predetermined distance is less than the first predetermined distance.

In other features, the control module is configured to: if the distance is less than the second predetermined distance and greater than a third predetermined distance away from the vehicle, adjust the minimum period at a first rate; and if the distance is less than the third predetermined distance, adjust the minimum period at a second rate.

In other features, the first predetermined distance refers to an impermissible access zone or lock zone of the vehicle. The second predetermined distance refers to a permissible access zone or unlock zone of the vehicle.

In other features, the first predetermined distance is 15-25 m. The second predetermined distance is 2-4 m.

In other features, the first predetermined distance is 20 m. The second predetermined distance is 3 m.

In other features, the control module is configured to: when the distance is greater than a permissible access boundary distance from the vehicle, (i) increase a range request rate if the mobile access device is approaching the vehicle, where the range request rate is a rate at which the control module requests an update of the distance from the vehicle, and (ii) decrease the range request rate if the mobile access device is moving away from the vehicle; and when the distance is less than or equal to the permissible access boundary distance from the vehicle, (i) reduce the range request rate if the mobile access device is approaching the vehicle, and (ii) increase the range request rate if the mobile access device is moving away from the vehicle.

In other features, the control module is configured to: set the wait period equal to a predetermined advertisement period when the distance is greater than a first predetermined distance; set the wait period equal to a first reduced period when the distance is greater than a second predetermined distance, where the first reduced period is shorter than the predetermined advertisement period, and where the second predetermined distance is less than the first predetermined distance; and set the wait period equal to a second reduced period when the distance is within a predetermined range of a third predetermined distance, where the second reduced period is shorter than the first reduced period, and where the third predetermined distance is less than the second predetermined distance.

In other features, the control module is configured to: set the wait period equal to a predetermined advertisement period when the distance is greater than a first predetermined distance; set the wait period equal to a first reduced period when the distance is greater than a second predetermined distance, where the first reduced period is shorter than the predetermined advertisement period, and where the second predetermined distance is less than the first predetermined distance; and set the wait period based on a product of a constant and difference between the distance and a third predetermined distance when the distance is less than or equal to the second predetermined distance, where the third predetermined distance is less than the second predetermined distance.

In other features, the control module is configured to: set the wait period equal to a predetermined advertisement period when the distance is greater than a first predetermined distance; set the wait period equal to a first reduced period when the distance is less than a second predetermined distance, where the first reduced period is shorter than the predetermined advertisement period, and where the second predetermined distance is less than the first predetermined distance; and set the wait period equal to a second reduced period when the distance is within a predetermined range of a third predetermined distance, where the second reduced period is shorter than the first reduced period, and where the third predetermined distance is greater than the second predetermined distance and less than the first predetermined distance.

In other features, the control module is configured to: set the wait period equal to a predetermined advertisement period when the distance is greater than a first predetermined distance; set the wait period equal to a first reduced period when the distance is less than a second predetermined distance, where the first reduced period is shorter than the predetermined advertisement period, and where the second predetermined distance is less than the first predetermined distance; and set the wait period based on a product of a constant and difference between the distance and a third predetermined distance when the distance is less than or equal to the third predetermined distance, where the third predetermined distance is greater than the second predetermined distance and less than the first predetermined distance.

In other features, an access system is provided and includes the mobile access device and an access module implemented at the vehicle and configured to: receive the advertisement signal and in response transmit the at least one of the connect signal or the authentication signal; receive the first challenge signal; and based on the first challenge signal, transmit the response signal to the mobile access device.

In other features, an access system for a vehicle is provided. The access system includes one or more transceivers and a control module. The one or more transceivers are configured to transmit and receive ultra-wideband signals, where the ultra-wideband signals include a first challenge signal. The control module is configured to: receive via the one or more transceivers the first challenge signal from a mobile access device to the vehicle; based on the first challenge signal, determine a distance between the mobile access device and the vehicle; transmit a response signal from the vehicle via the one or more transceivers, where the response signal indicates the distance; passively maintain the vehicle in a locked state while the distance is greater than a predetermined distance; and passively unlock the vehicle when the distance is less than the predetermined distance and passively maintain the vehicle in an unlocked state while the distance is less than the predetermined distance.

In other features, the one or more transceivers include a first transceiver and a second transceiver. The first transceiver is a Bluetooth low energy transceiver. The second transceiver is an ultra-wideband transceiver. The control module is configured to transmit the response signal via the first transceiver or the second transceiver.

In other features, the one or more transceivers include a first transceiver and a second transceiver. The first transceiver is a low frequency or near field communication transceiver. The second transceiver is an ultra-wideband transceiver. The control module is configured to transmit the response signal via the first transceiver or the second transceiver.

In other features, the one or more transceivers include a first transceiver and a second transceiver. The first transceiver is configured to operate according to a first communication standard. The second transceiver is configured to operate according to a second communication standard. The control module is configured to: receive via the first transceiver an advertisement signal transmitted from the mobile access device and in response transmitting at least one of a connect signal or authentication signal to establish a connection with the mobile access device; and when the connection is established, receive via the second transceiver the first challenge signal from the mobile access device.

In other features, the control module is configured to: subsequent to a minimum period, receive a second challenge signal from the mobile access device; and update the distance between the mobile access device and the vehicle based on the minimum period, where the minimum period is a minimum of a predetermined advertisement period and a wait period, and where the wait period is based on the distance.

In other features, the access system further includes sensors configured to generate sensor signals. The control module is configured to: based on the sensor signals, determine whether the mobile access device is at least one of within the vehicle or within a predetermined range of the vehicle; and passively start the vehicle when the mobile access device is at least one of within the vehicle or within the predetermined range of the vehicle.

In other features, the access system further includes sensors configured to generate sensor signals. The control module is configured to: based on the sensor signals, determine whether (i) the mobile access device is at least one of within the vehicle or within a predetermined range of the vehicle, and (ii) a secondary action has been taken to passively start the vehicle; and passively start the vehicle when (i) the mobile access device is at least one of within the vehicle or within the predetermined range of the vehicle, and (ii) the secondary action has been taken.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
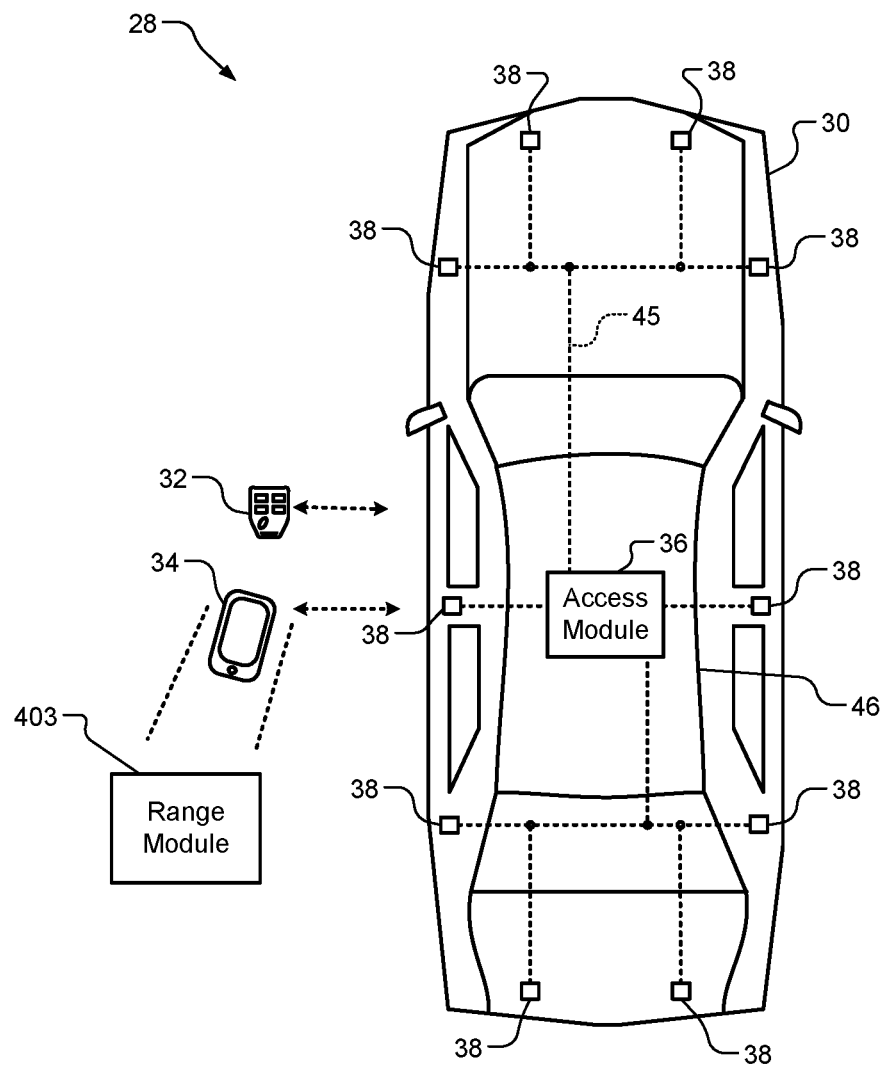
FIG. 1 is a functional block diagram of an example of a vehicle access system including a portable access device with a range module in accordance with an embodiment of the present disclosure.

A key fob with no low frequency function (e.g., communication over low frequencies, such as 125 kHz) may send a Bluetooth® low-energy (BLE) message periodically to ensure a connection with a vehicle while approaching the vehicle. The BLE message may be referred to as an advertisement. An advertisement period at which BLE messages are transmitted can be set to ensure that the key fob is connected prior to entering an unlock zone. An unlock zone refers to a zone in which the vehicle is passively unlocked, meaning the vehicle unlocks doors without user interaction with the key fob and the vehicle. When the key fob is connected and authenticated and within the unlock zone, the vehicle unlocks the doors.

The key fob is subject to large battery power consumption while maintaining a connection with the vehicle until access to the vehicle is granted and the doors are unlocked. As an example, when the key fob is far from the vehicle (e.g., more than 20 meters), then an advertisement rate of the key fob may be at a slow rate (e.g., every few seconds). As such there is low battery power consumption. If however (i) the key fob is close to the vehicle (e.g., less than 20 meters), but not yet within a predetermined range of the unlock zone, (ii) the key fob is wirelessly connected to the vehicle, and (iii) there is a delay until the key fob is within the predetermined range, then there is large battery power consumption. When the key fob is, for example, 3-20 meters (m) away from the vehicle, the key fob may be continuously (or at a high rate) transmitting advertisements to check if the key fob is within the predetermined range of the unlock zone. As another example, for a user walking at 1.4 meters/second, when a key fob, carried by the user, is 17 meters away from a vehicle, it takes 10 seconds until the user is within an unlock zone of 3 m. A total of continuous RF for 10 seconds greatly reduces a charge state of a battery of the key fob. The large battery consumption requires frequent charging and/or battery replacement. A motion sensor may be implemented in the key fob to reduce the advertisement rate when the key fob is not being moved to limit power consumption.

A PAK system may include multiple ultra-wideband (UWB) sensors installed throughout a vehicle and one or more Bluetooth® low-energy (BLE) nodes (e.g., BLE transceivers and antennas). The BLE nodes are also implemented in the vehicle and used to wake up a mobile access device (e.g., a key fob, a mobile phone, a wearable device, etc.). The UWB sensors are used to precisely determine the location of the mobile access device relative to the vehicle. As further described herein, when determining a location of a mobile access device, it is determined whether the mobile access device is in or outside of one or more predefined zones relative to the corresponding vehicle. The predefined zones may include one or more zones internal or external to the vehicle. The internal zones may include one or more zones within a cabin of the vehicle and/or in other areas of the vehicle, such as in a trunk or tail gate space of the vehicle.

The examples set forth herein include access systems, such as PAK systems, that include the mobile access devices adjusting wait periods between range requests (referred to as range request rates) to minimize battery usage of the mobile access devices. In some embodiments, the wait periods are set based on distances of mobile access devices (e.g., key fobs and mobile phones) relative to the vehicles, which may be reported by the vehicles to the mobile access devices. Connections are maintained while minimizing advertisement rates. These features reduce power consumption in the mobile access devices and the vehicle.

FIG. 1 shows a vehicle access system 28 that performs as a PEPS system and a PAK system. The vehicle access system 28 includes a vehicle 30 and may include a key fob 32, a mobile phone 34, and/or other portable (or mobile) access devices, such as a wearable device, a laptop computer, or other portable network device. The mobile access devices may be, for example, a Bluetooth®-enabled and UWB-enabled communication device, such as a smart phone, smart watch, wearable electronic device, key fob, tablet device, or other device associated with a user of the vehicle 30. In one embodiment, one or more of the mobile access devices are UWB-enabled and are not Bluetooth®-enabled. In another embodiment, one or more of the mobile access devices are UWB-enabled and are LF and/or near field communication (NFC) enabled. The user may be an owner, driver, or passenger of the vehicle 30 and/or a technician for the vehicle 30.

The vehicle 30 includes an access module 36 and antenna modules 38. One or more of the antenna modules 38 may be included in the access module 36. As an example, the antenna modules 38 may each be implemented as one or more antennas. The access module 36 may wirelessly transmit and receive BLE, UWB, LF and/or NFC signals via the antenna modules 38 including wirelessly communicating with the portable access devices. As an example, the UWB signals may be spread over a large bandwidth of greater than 500 Mega-Hertz (MHz). The BLE and/or UWB signals may be transmitted to and/or received from the portable access devices and used to connect with and track a location and movement of the portable access devices. When only UWB signals are transmitted, the UWB signals may be used for both connecting with and tracking location and movement of portable access devices. When UWB and LF (or NFC) signals are transmitted, The LF (or NFC) signals may be transmitted to determine distances of the portable access device relative to the vehicle without transmitting connection and/or advertisement signals and the UWB signals may be used for precise secure ranging including transmission of challenge signals, as further described below. Although particular numbers of antenna modules 38 are shown, any number of each may be utilized. The access module 36 may communicate with some of the antenna modules 38 wirelessly and/or via a vehicle interface 45. As an example, the vehicle interface 45 may include a controller area network (CAN) bus, a local interconnect network (LIN) for lower data-rate communication, a clock extension peripheral interface (CXPI) bus and/or one or more other vehicle interfaces.

The antenna modules 38 may be at various locations on the vehicle and transmit and receive high frequency RF (e.g., BLE) signals, UWB, LF and/or NFC signals. Each of the antenna modules 38 may include a RF, BLE, UWB LF and/or NFC antenna and may include a control module and/or other circuitry for RF, BLE, UWB LF and/or NFC signal transmission. The antenna modules 38 may transmit BLE signals according to BLE communication protocols. Alternatively, the antenna modules 38 may communicate according to other wireless communication protocols, such as wireless fidelity (Wi-Fi). In one embodiment and to improve signal coverage relative to the vehicle and improve transmission and reception characteristics, the antenna modules 38 are located in a roof 46 of the vehicle 30.

Figure 2:
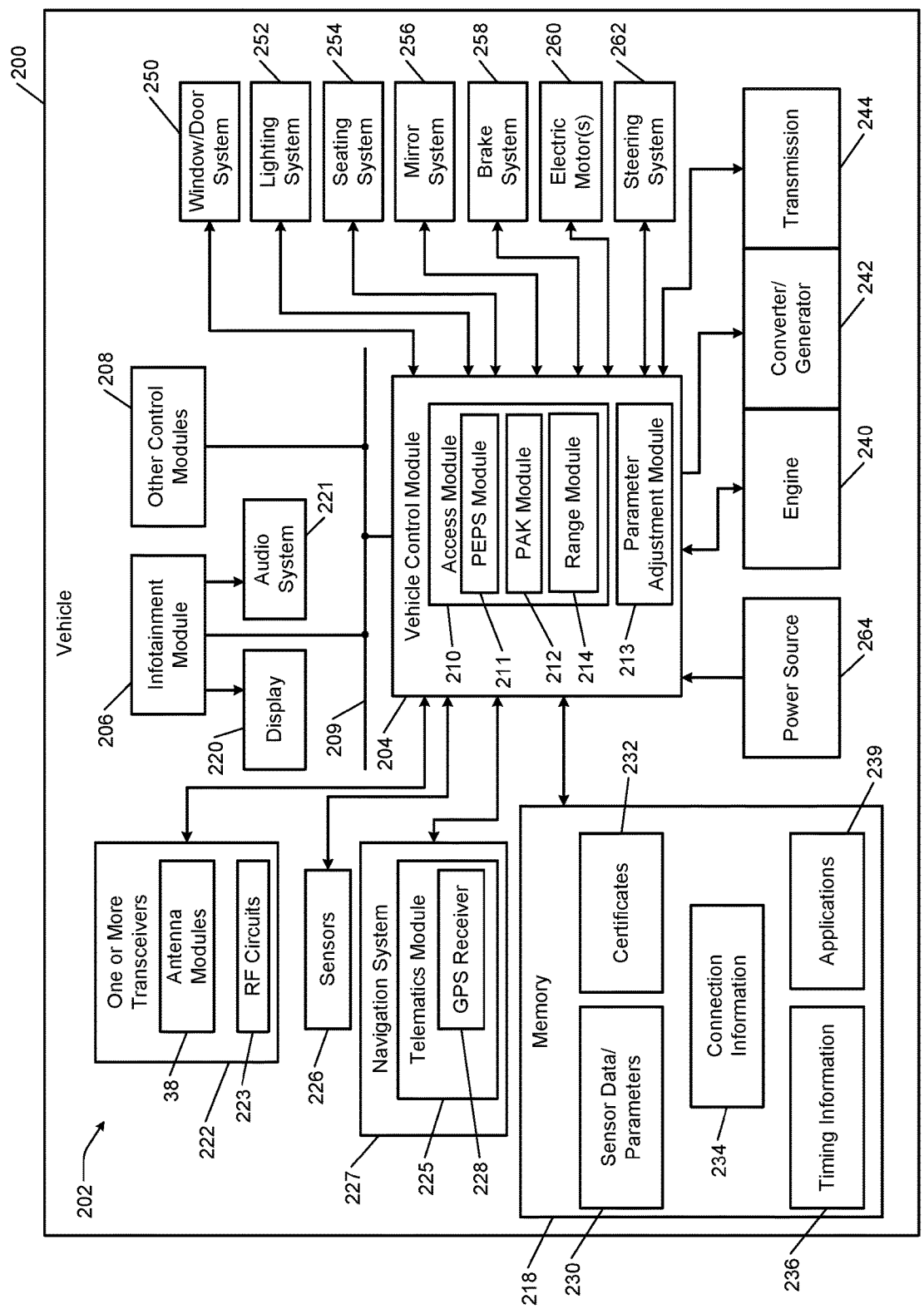
FIG. 2 is a functional block diagram of an example of a vehicle including an access module in accordance with an embodiment of the present disclosure.
Figure 3:
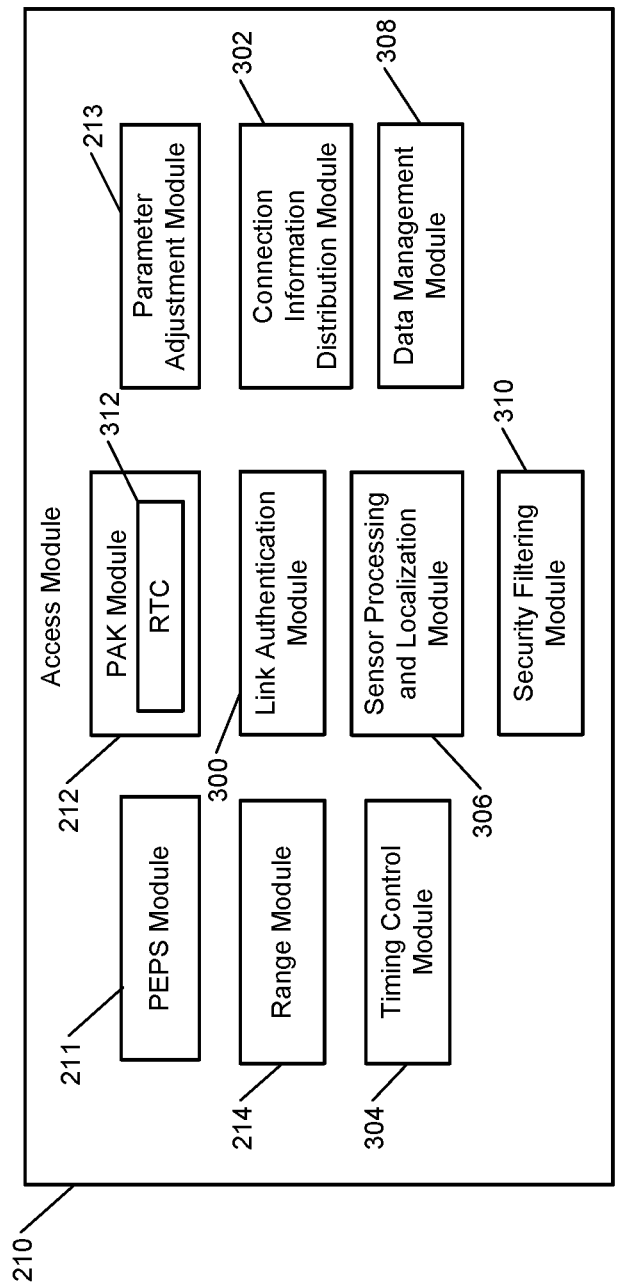
FIG. 3 is a functional block diagram of an example of the access module of FIG. 2 in accordance with an embodiment of the present disclosure.

FIG. 2 shows a vehicle 200 that is an example of the vehicle 30 of FIG. 1. The vehicle 200 includes a PAK system 202, which includes a vehicle control module 204, an infotainment module 206 and other control modules 208 (e.g., a body control module). The modules 204, 206, 208 may communicate with each other via a bus 209 and/or other vehicle interface (e.g., the vehicle interface 45 of FIG. 1). As an example, the bus 209 may include a controller area network (CAN) bus, a local interconnect network (LIN) for lower data-rate communication, a clock extension peripheral interface (CXPI) bus and/or one or more other vehicle interfaces. The vehicle control module 204 may control operation of vehicles systems. The vehicle control module 204 may include an access module 210, a PEPS module 211, a PAK module 212 a parameter adjustment module 213 and a range response module 214, as well as other modules, some of which are shown in FIG. 3. FIG. 2 is an example of when an access module (e.g., the access module 210) is implemented as a separate module from the antenna modules 38 and transceivers 222. The transceivers 222 include BLE and UWB transceivers.

The vehicle control module 204 may also include one or more processors that are configured to execute instructions stored in a non-transitory computer-readable medium, such as the memory 218, which may include read-only memory (ROM) and/or random access memory (RAM).

The PEPS module 211 may perform PEPS operations to provide access to an interior of the vehicle and permit starting and/or operation of the vehicle. Starting the vehicle may refer to powering ON devices of the vehicle, starting an internal combustion engine, starting a motor of the vehicle, and/or starting other operations of the vehicle. The PAK module 212 operates in cooperation with the PEPS module 211 and performs PAK operations as described herein. The PEPS module 211 may include the PAK module 212 or the modules 211, 212 may be implemented as a single module. The parameter adjustment module 213 may be used to adjust parameters of the vehicle 200. The range module 214 generates range response signals for range determinations. The range modules determine wait periods between range requests based on distances between mobile access devices and the vehicle 200. These features are further described below.

The PAK system 202 may further include: a memory 218; a display 220; an audio system 221; and one or more transceivers 222 including the antenna modules 38. The antenna modules 38 may include and/or be connected to RF circuits 223. The PAK system 202 may further include: a telematics module 225; sensors 226; and a navigation system 227 including a global positioning system (GPS) receiver 228. The one or more transceivers 222 may transmit and receive RF, BLE, UWB, LF and/or NFC signals. The RF circuits 223 may be used to communicate with a mobile device (e.g., the mobile device 32 or 34 of FIG. 1) including transmission of Bluetooth® signals at 2.4 giga-Hertz (GHz). The RF circuits 223 may include BLE radios, transmitters, receivers, etc. for transmitting and receiving RF signals.

The one or more transceivers 222 may include a RF transceiver including the RF circuits 223 and implement an access application having code to inspect timestamped data received and transmitted by the antenna modules 38. The access application may confirm whether the antenna modules 38 have, for example, received correct data at the correct time. The access application may be stored in the memory 218 and implemented by the PEPS module 211 and/or the PAK module 212. Other example operations of the access application are further described below.

The access application may implement a Bluetooth® protocol stack that is configured to provide a channel map, access identifier, next channel, and a time for a next channel. The access application is configured to output timing signals for timestamps for signals transmitted and received via the antenna modules 38. The access application may obtain channel map information and timing information and share this information with other modules in the vehicle.

The telematics module 225 may communicate with a server via a cell tower station. This may include the transfer of certificates, license information, and/or timing information including global clock timing information. The telematics module 225 is configured to generate location information and/or error of location information associated with the vehicle 200. The telematics module 225 may be implemented by a navigation system 227.

The sensors 226 may include sensors used for PEPS and PAK operations, cameras, objection detection sensors, temperature sensors, accelerometers, vehicle velocity sensor, and/or other sensors. The sensors 226 may include a touch sensor to detect, for example, a person touching a door handle to initiate a process of waking up a portable access device. The sensors 226 may be connected to the other control modules 208, such as the body control module, which may be in communication with LF and RF antenna circuits and/or modules disclosed herein. The GPS receiver 228 may provide vehicle velocity and/or direction (or heading) of the vehicle and/or global clock timing information.

The memory 218 may store sensor data and/or parameters 230, certificates 232, connection information 234, timing information 236, and applications 239. The applications 239 may include applications executed by the modules 38, 204, 206, 208, 210, 211, 212, 214, 223 and/or transceivers 222. As an example, the applications may include the access application, a PEPS application and/or a PAK application executed by the transceivers 222 and the modules 210, 211, 212 and/or 214. Although the memory 218 and the vehicle control module 204 are shown as separate devices, the memory 218 and the vehicle control module 204 may be implemented as a single device. The single device may include one or more other devices shown in FIG. 1.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208, 210, 211, 212, 213, 214. The vehicle control module 204 may perform PEPS and/or PAK operations, which may include setting some of the parameters. The PEPS and PAK operations may be based on signals received from the sensors 226 and/or transceivers 222. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PAK operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 226, the navigation system 227, the GPS 228 and the above-stated data and information stored in the memory 218.

Referring now also to FIG. 3, which shows the access module 210. The access module 210 includes the PEPS module 211, the PAK module 212, the parameter adjustment module 213, the range module 214 and may further include a link authentication module 300, a connection information distribution module 302, a timing control module 304, a sensor processing and localization module 306, a data management module 308 and a security filtering module 310. The PAK module 212 may include a real time clock (RTC) 312 that maintains a local clock time.

The link authentication module 300 may authenticate the portable access devices of FIG. 1 and establish the secure communication link. For example, the link authentication module 300 can be configured to implement challenge-response authentication or other cryptographic verification algorithms in order to authenticate the portable access devices.

The connection information distribution module 302 is configured to communicate with some of the sensors 226 of FIG. 2 and provide the sensors with communication information necessary for the sensors to find and then follow, or eavesdrop on, the secure communication link. This may occur once the sensors are synchronized with a communication gateway, which may be included in or implemented by one of the transceivers 222. As an example, the vehicle 200 and/or the PAK system 202 may include any number of sensors disposed anywhere on the vehicle 200 for detecting and monitoring mobile devices. The connection information distribution module 302 is configured to obtain information corresponding to communication channels and channel switching parameters of a communication link and transmit the information to the sensors 226. In response to the sensors 226 receiving the information from the connection information distribution module 302 via a bus or other vehicle interface disclosed herein and the sensors 226 being synchronized with the communication gateway, the sensors 226 may locate and follow, or eavesdrop on, the communication link.

The timing control module 304 may: maintain the RTC and/or currently stored date if not handled by the PAK module 212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 304 may obtain timing information corresponding to a communication link when the link authentication module 300 executes challenge-response authentication. The timing control module 304 is also configured to provide the timing information to the sensors 226 via the vehicle interface 209.

After link authentication is established, the data management module 308 collects the current location of the vehicle 200 from the telematics module 225. The range module 214 determines locations of the portable access devices relative to the vehicle 200. This may include performing an exchange of UWB challenge signals to determine precise secured distances between the vehicle 200 and the portable access devices. Based on the estimated distances between the portable access devices and the vehicle 200, the portable access devices can wait determined periods of time, as described below prior to performing a subsequent exchange of UWB signals (referred to as a set of range request/response signals) to determine updated locations of the portable access devices.

The security filtering module 310 detects violations of a physical layer and protocol and filter data accordingly before providing information to the sensor processing and localization module 306. The security filtering module 310 flags data as injected such that the sensor processing and localization module 306 is able to discard data and alert the PEPS module 211. The data from the sensor processing and localization module 306 is passed along to the PEPS module 211, whereby the PEPS module 211 is configured to read vehicle state information from the sensors in order to detect user intent to access a feature and to compare the location of the mobile device to a set of locations that authorize certain vehicle features, such as unlocking a door or trunk of the vehicle and/or starting the vehicle.

Figure 4:
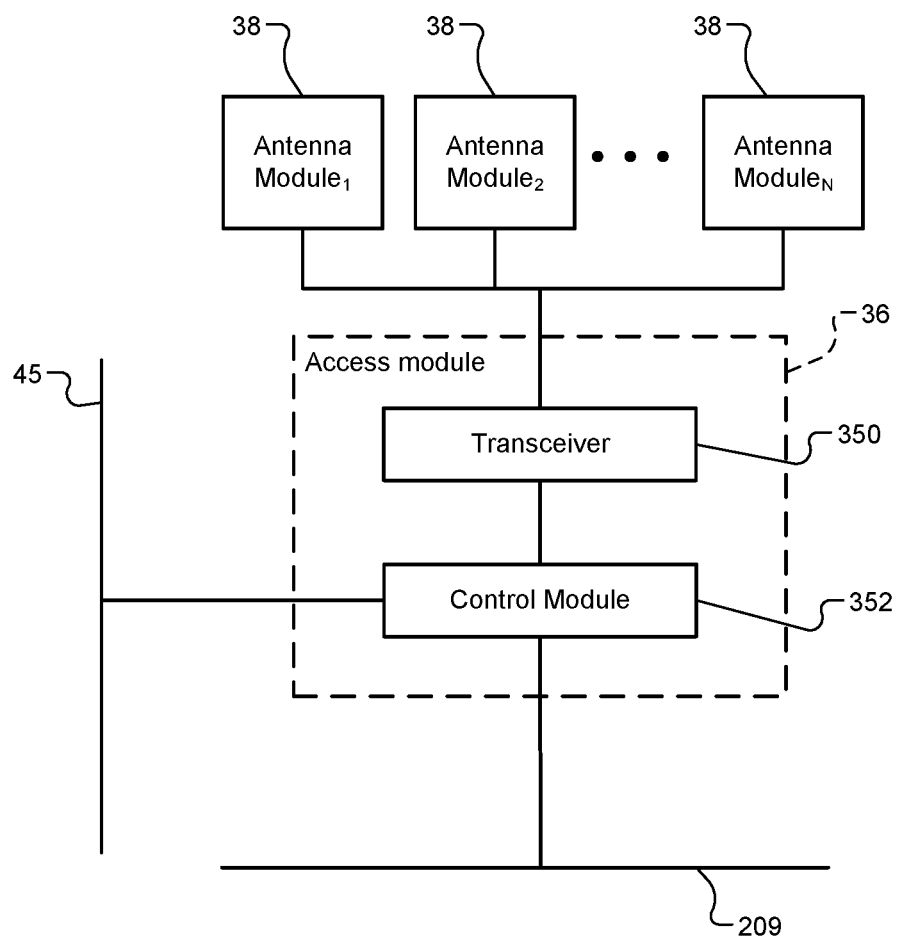
FIG. 4 is a functional block diagram of an example of antenna modules and the access module of FIG. 1.

FIG. 4 is an example of the access module 36 of FIG. 1. The access module 36 may include or be connected to one or more antenna modules 38. The access module 36 may include a transceiver 350 and a control module 352. The control module 352 may be implemented similarly as the access module 210 of FIGS. 2 and 3. The transceiver 350 may be configured to transmit and/or receive RF, BLE, UWB, LF and/or NFC signals. The control module 352 may include or be part of a BLE communication chipset and/or include or be part of a Wi-Fi or Wi-Fi direct communication chipset. Some or all of the operations of the control module 352 may be implemented by one or more of the modules 204, 210, 211, 212, 214 of FIG. 2.

The control module 352 (or one or more of the modules 204, 210, 211, 212 of FIG. 2) may establish a secure communication connection with a portable access device (e.g., one of the portable access devices 32, 34 of FIG. 1). For example, the control module 352 may establish a secure communication connection using the BLE communication protocol this may include transmitting and/or receiving timing and synchronization information. The timing and synchronization information may include information directed to the secure communication connection, such as timing of next communication connection events, timing intervals between communication connection events, communication channels for next communication connection events, a channel map, a channel hop interval or offset, communication latency information, communication jitter information, etc. The control module 352 may detect (or "eavesdrop") packets sent by the portable access device to the vehicle control module 204 and measure signal information of the signals received from the portable access device. The channel hop interval or offset may be used to calculate a channel for a subsequent communication connection event.

The control module 352 may measure a received signal strength of a signal (e.g., a LF or NFC signal) received from the portable access device and generate a corresponding RSSI value. Additionally or alternatively, the control module 352 may take other measurements of transmitted and received signals from the portable access device, such as an angle of arrival, a time of flight, a time of arrival, a time difference of arrival, etc. As an example, LF and/or NFC signals may be transmitted for determining distances between portable access devices and a vehicle. As another example, time of flight calculations may be made to measure time of flight of UWB signals. The control module 352 may then send the measured information to the vehicle control module 204, which may then determine a location of and/or distance to the portable access device relative to the vehicle 30 based on the measured information. The location and distance determinations may be based on similar information received from one or more other antenna modules and/or other sensors.

As an example, the vehicle control module 204 may determine the location of the portable access device based on, for example, the patterns of the RSSI values corresponding to signals received from the portable access device by the antenna modules 38. A strong (or high) RSSI value indicates that the portable access device is close to the vehicle 30 and a weak (or low) RSSI value indicates that the portable access device is further away from the vehicle 30. By analyzing the RSSI values, the control module 204 may determine a location of and/or a distance to the portable access device relative to the vehicle 30. Additionally or alternatively, angle of arrival, angle of departure, round trip timing, unmodulated carrier tone exchange, or time difference of arrival measurements for the signals sent between the portable access device and the control module 204 may also be used by the control module 204 or the portable access device to determine the location of the portable access device. Additionally or alternatively, the antenna modules 38 may determine the location of and/or distance to the portable access device based on the measured information and communicate the location or distance to the control module 204.

Based on the determined location of or distance to the portable access device relative to the vehicle 30, the modules 211, 212 of FIG. 2 may then authorize and/or perform a vehicle function, such as unlocking a door of the vehicle 30, unlocking a trunk of the vehicle 30, starting the vehicle 30, and/or allowing the vehicle 30 to be started. As another example, if the portable access device is less than a first predetermined distance from the vehicle 30, the modules 211, 212 may activate interior or exterior lights of the vehicle 30. If the portable access device is less than a second predetermined distance from the vehicle 30, the modules 211, 212 may unlock doors or a trunk of the vehicle 30. If the portable access device is located inside of the vehicle 30, the modules 211, 212 may allow the vehicle 30 to be started. Based on the determined location of or distance to the portable access device relative to the vehicle 30, access module 36 and/or range module 214 may also perform certain operations as further described below.

Figure 5:
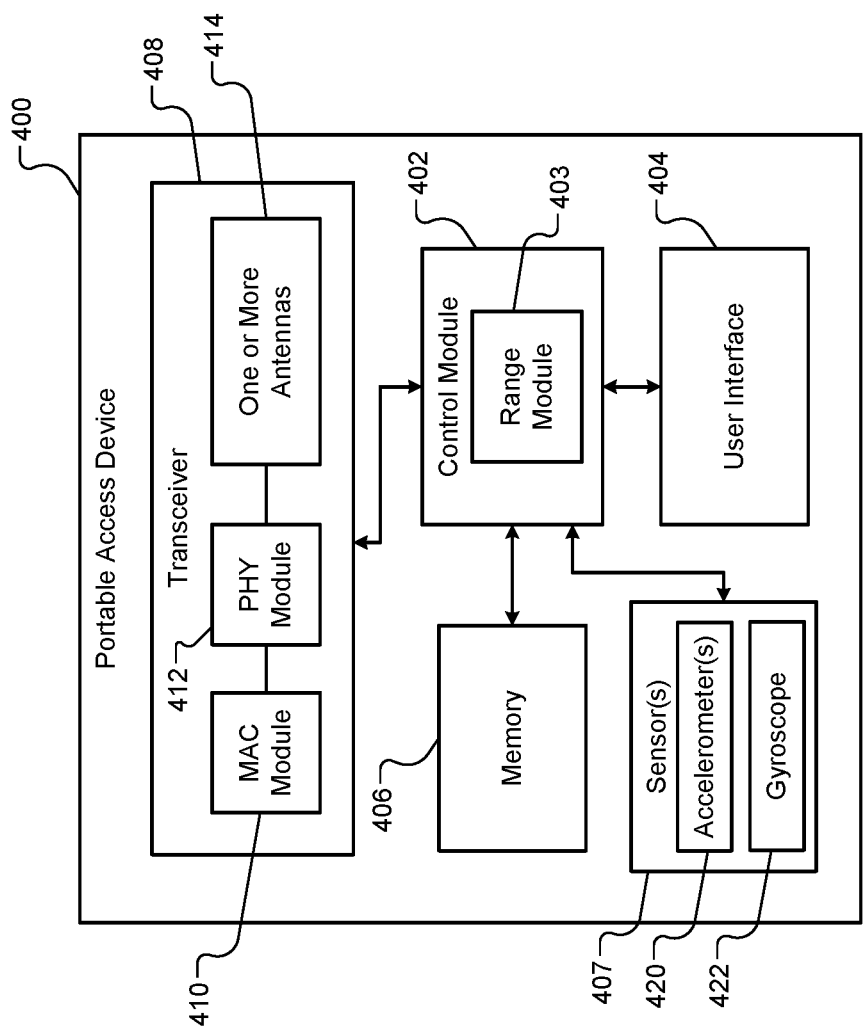
FIG. 5 is a functional block diagram of an example of a portable network device including the range module in accordance with an embodiment of the present disclosure.

FIG. 5 shows an example portable (or mobile) access device 400, which is an example of each of the portable access devices 32, 34 of FIG. 1. The portable access device 400 may include a control module 402, a user interface 404, a memory 406, sensors 407 and a transceiver 408. The transceiver 408 may include a MAC module 410, a PHY module 412 and one or more antennas 414. The transceiver 408 may transmit and receive RF, LF, NFC, BLE and/or UWB signals. The transceiver 408 may be implemented as one or more transceivers, each of which operating according to one or more corresponding communication protocols. In one embodiment, the transceiver 408 is configured to operate according to only a single communication protocol and transmits and receives UWB signals. In another embodiment, the transceiver 408 operates according to multiple communication protocols and transmits and receives (i) UWB signals, and (ii) one or more of BLE, LF or NFC signals.

The control module 402 may include or be part of a BLE and/or UWB communication chipset. Alternatively, the control module 402 may include or be part of a Wi-Fi or Wi-Fi direct communication chipset. The memory 406 may store application code that is executable by the control module 402. The memory 406 may be a non-transitory computer-readable medium including read-only memory (ROM) and/or random-access memory (RAM).

The control module 402 may include a range module 403 (also shown in FIG. 1) and communicate with the vehicle control module 204 of the vehicle and performs authentication and other operations as further described below. The range module 403 may perform a UWB signal exchange with the range module 214 of FIG. 2 to allow the vehicle to determine a location of the portable access device 400. In alternative embodiment, the vehicle control module 204 reports the location of the vehicle to the portable access device 400 and the range module 403 determines, based on the location of the portable access device 400 and the location of the vehicle, distance between the portable access device 400 and the vehicle. Single sided ranging, double sided ranging, time-of-flight determining, round trip time determining, etc. may be performed to determine distances between portable access devices and a vehicle.

The control module 402 may transmit information regarding the portable access device 400, such as location, heading and/or velocity information obtained from one or more of the sensors 407 (e.g., a global navigation satellite system (e.g., GPS) sensor, an accelerometer, a gyroscope, and/or an angular rate sensor). In the example shown, the sensors 407 include one or more accelerometers 420 and/or a gyroscope 422. In another embodiment, the gyroscope 422 is not utilized. The user interface 404 may include a key pad, a touch screen, a voice activated interface, and/or other user interface.

Figure 6:
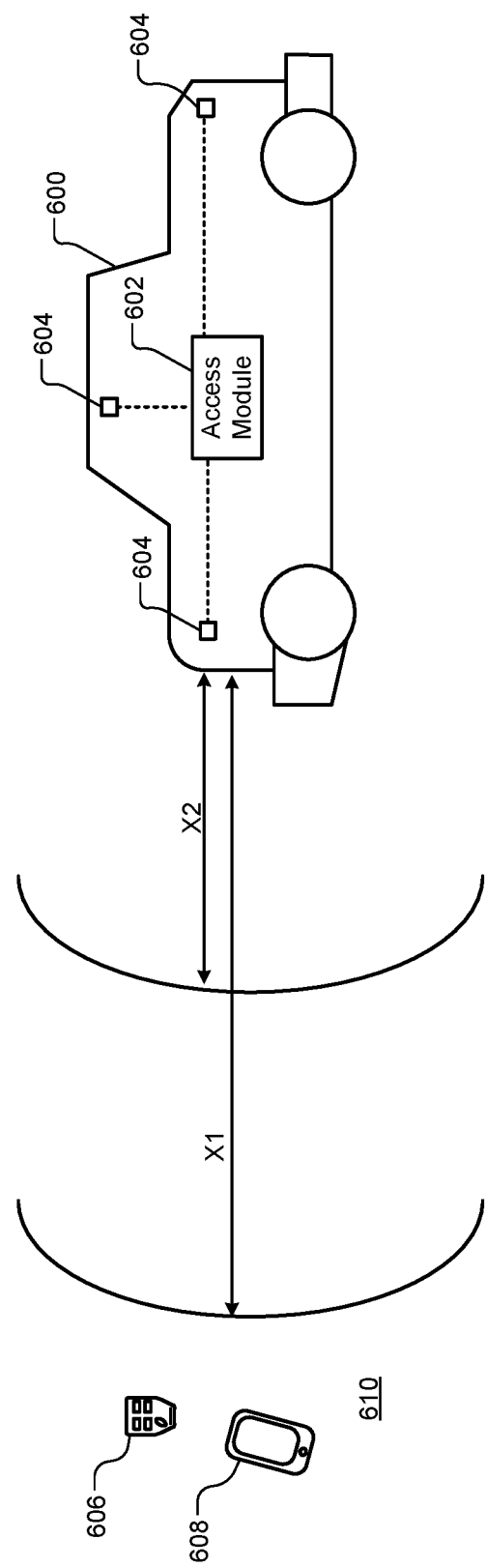
FIG. 6 is a side view of a vehicle illustrating different access zones in accordance with an embodiment of the present disclosure.

FIG. 6 is a side view of a vehicle 600 illustrating different access zones. The vehicle 600 may be configured and operate similar to the vehicles 30 and 200 of FIGS. 1-2. The vehicle 600 includes an access module 602 (similar to the access modules 36 and 210, and antenna modules 604, similar to the antenna modules 38. The range X1 refers to a permissible access zone. As used herein a "permissible access zone" may refer to an unlock zone, a passive lighting zone, or other permissible access zone associated with performing a passive operation. As an example, the range X1 may be 3 m. In one embodiment, the range X1 is 2-4 m. In an example embodiment, the range X2 refers to a zone in which initiation of a next range request exchange is delayed to conserve battery power in a portable access device, such as the portable access devices 606, 608. An area 610 outside of a boundary of the range X1 refers to an impermissible access zone and/or lock zone.

Figure 7:
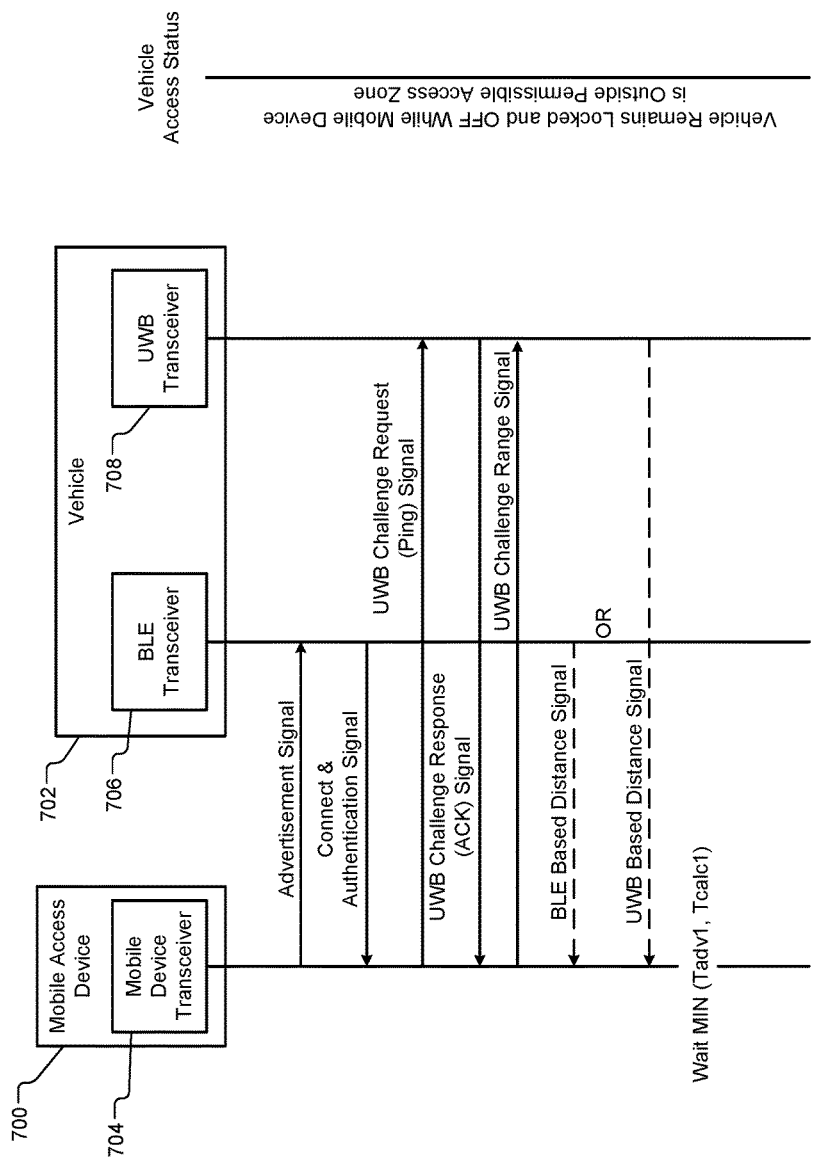
FIG. 7 is a signal timing diagram for when a mobile access device is outside a permissible access zone of a vehicle in accordance with an embodiment of the present disclosure.

FIG. 7 is a signal timing diagram for when a mobile (or portable) access device 700 is outside a permissible access (or unlock) zone of a vehicle 702. The mobile access device 700 includes a mobile device transceiver 704. The vehicle 702 includes a BLE transceiver 706 and a UWB transceiver 708. The mobile access device 700 and the vehicle 702 may be configured and operate similarly as the mobile access devices and vehicles described above.

The mobile device transceiver 704 transmits an advertisement signal according to a BLE protocol, which is received at the BLE transceiver 706. The BLE transceiver 706 responds with a connect signal and/or authentication signal. The mobile device transceiver 704 then transmits a UWB change request signal (or ping signal) to the UWB transceiver 708. The UWB transceiver 708 responds with a UWB challenge response (or acknowledge (ACK)) signal. The mobile device transceiver 704 then responds with a UWB challenge range signal.

An access module and/or range module of the vehicle may then determine distance between the mobile access device 700 based on, for example, a time of flight (or round trip time) associated with transmitting the ACK signal and the UWB challenge range signal. The access module and/or range module may then transmit the distance to the mobile access device 700 via the BLE transceiver 706 or the UWB transceiver 708. A distance signal indicating the distance may be transmitted and include a sum, minimum, and/or maximum distance based on sensor data. The sensor data may include BLE, UWB and/or other sensor data.

A control module and/or range module of the mobile access device 700 may determine a period to wait (referred to as a wait period) based on the indicated distance information and prior to sending a subsequent Ping signal. The subsequent Ping signal may be transmitted to initiate another range request exchange to obtain an updated distance between the mobile access device 700 and the vehicle 702. As an example, the period may be a minimum of an advertisement period and a calculated variable wait period. The advertisement period may be used, for example, when the mobile access device 700 is more than a predetermined distance outside of the permissible access zone. As an example, the advertisement period may be used when the mobile access device is greater than or equal to 20 m away from the vehicle. In one embodiment, this occurs when the mobile access device is greater than or equal to 15-25 m away from the vehicle.

The adaptive timing may be tuned to limit the number of range request exchanges (or cycles) performed. This may occur while the portable access device is wirelessly linked (or connected) to the vehicle. As an example, when the unlock boundary is 3 m, the calculated wait period Tcalc may be set equal to: a first wait period (e.g., 1.5 s) if the distance is greater than a first predetermined distance (e.g., 5 m); a second wait period (e.g., 100 milli-seconds (ms)) if the distance is within a predetermined range of the unlock boundary (e.g., 3 m±20 centimeters); and a third wait period of if the distance is less than or equal to the first predetermined distance. The first, second and third wait periods may be less than a predetermined advertisement period associated with being outside a second predetermined distance (e.g., 20 m). The third wait period may be implemented when the mobile access device is within the first predetermined distance and outside the predetermined range. The third wait period may be equal to a product of (i) the distance minus the unlock boundary (e.g., 3 m) and (ii) a predetermined constant value (e.g., 1.4) divided by 2 (for a linear formula).

As another example, the calculated wait period Tcalc may be 350 ms when the unlock boundary is 3.5 m. As another example, the calculated wait period Tcalc may be 700 ms when the unlock boundary is 4.0 m. As yet another example, the range module may be configured such that a 3.5 m unlock boundary is used instead of a 3 m unlock boundary and when the distance is greater than 3.5 m, then Tcalc is 1.5 s and when the distance is less than 3.5 m, then Tcalc is 0.75 s. As a result and for this example, when the mobile access device is within a predetermined range of the unlock boundary, the wait period is less when inside the unlock boundary than when outside the unlock boundary.

Figure 8:
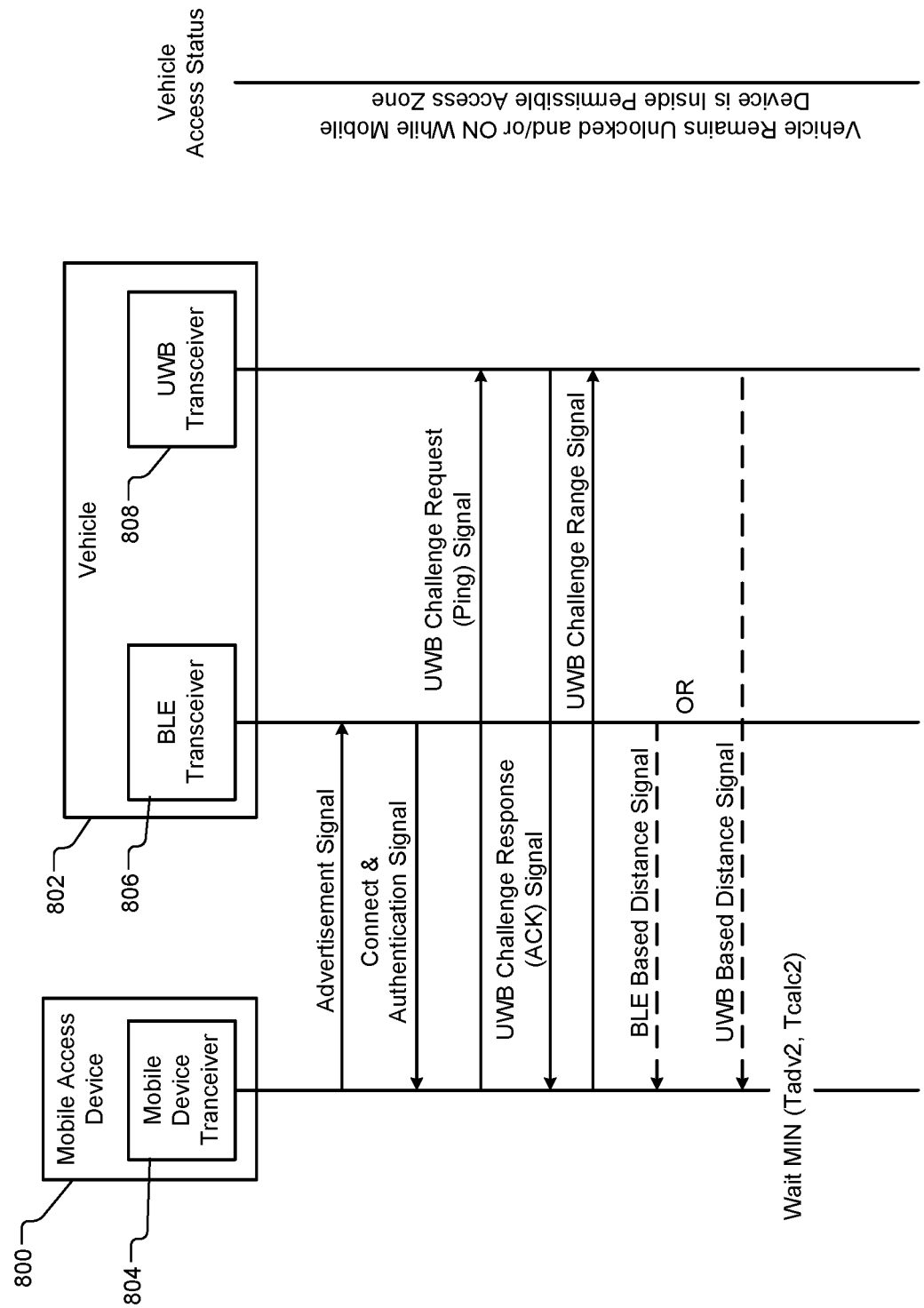
FIG. 8 is a signal timing diagram for when a mobile access device is inside a permissible access zone of a vehicle in accordance with an embodiment of the present disclosure.

FIG. 8 is a signal timing diagram for when a mobile (or portable) access device 800 is inside a permissible access (or unlock) zone of a vehicle 802. The mobile access device 800 includes a mobile device transceiver 804. The vehicle 802 includes a BLE transceiver 806 and a UWB transceiver 808. The mobile access device 800 and the vehicle 802 may be configured and operate similarly as the mobile access devices and vehicles described above.

The mobile device transceiver 804 transmits an advertisement signal according to a BLE protocol, which is received at the BLE transceiver 806. The BLE transceiver 806 responds with a connect signal and/or an authentication signal. The mobile device transceiver 804 then transmits a UWB change request signal (or ping signal) to the UWB transceiver 808. The UWB transceiver 808 responds with a UWB challenge response (or acknowledge (ACK)) signal. The mobile device transceiver 804 then responds with a UWB challenge range signal.

An access module and/or range module of the vehicle may then determine distance between the mobile access device 800 based on, for example, a time of flight (or round trip time) associated with transmitting the ACK signal and the UWB challenge range signal. The access module and/or range module may then transmit the distance to the mobile access device 800 via the BLE transceiver 806 or the UWB transceiver 808. A distance signal indicating the distance may be transmitted and include a sum, minimum, and/or maximum distance based on sensor data. The sensor data may be BLE, UWB and/or other sensor data.

A control module and/or range module of the mobile access device 800 may determine a period to wait (referred to as a wait period) based on the indicated distance information and prior to sending a subsequent Ping signal. The subsequent Ping signal may be transmitted to initiate another range request exchange to obtain an updated distance between the mobile access device 700 and the vehicle 802. As an example, the period may be a minimum of an advertisement period and a calculated variable wait period. The advertisement period may be used, for example, when the mobile access device 800 is more than a predetermined distance outside of the permissible access zone. As an example, the advertisement period may be used when the mobile access device is greater than or equal to 20 m away from the vehicle.

As an example, when the unlock boundary is 3 m, the calculated wait period Tcalc may be set equal to: a first wait period (e.g., 1.5 s) if the distance is less than a first predetermined distance (e.g., 2 m); a second wait period (e.g., 100 milli-seconds (ms)) if the distance is within a predetermined range of the unlock boundary (e.g., 3 m±20 centimeters); and a third wait period of if the distance is less than or equal to the unlock boundary distance. The first, second and third wait periods may be less than a predetermined advertisement period associated with being outside a second predetermined distance (e.g., 20 m). The third wait period may be implemented when the mobile access device is within the unlock boundary distance and outside the predetermined range.

The third wait period may be equal to a product of (i) the unlock boundary (e.g., 3 m) minus the distance and (ii) a predetermined constant value (e.g., 1.4) divided by 2 (for a linear formula). As an example, the calculated wait period Tcalc may be 750 ms when the distance is 2.5 m. The adaptive timing may be tuned to limit the number of range request exchanges (or cycles) performed. This may occur while the portable access device is wirelessly linked (or connected) to the vehicle. As another example, the range module may be configured such that a 2.5 m unlock boundary is used instead of a 3 m unlock boundary and when the distance is greater than 2.5 m, then Tcalc is 0.75 s and when the distance is less than 2.0 m, then Tcalc is 1.6 s. As a result and in this example, the wait period increases when the mobile access device is within the unlock zone and approaching the vehicle.

In one embodiment, a first wait period is used between advertisement transmissions by a mobile access device. A second wait period that is less than the first wait period is used when the mobile access device is within a predetermined range of a permissible access boundary. Time to wait when close to the permissible access boundary is reduced when the mobile access device is expected to shortly be within the permissible access zone and a passive unlock event is to be performed. Once in the permissible access zone and the vehicle is unlocked, the wait period between range request exchanges may be increased when the mobile access device is moving towards the vehicle. The wait period may be decreased when in the permissible access zone and moving towards the permissible access boundary. The vehicle may be passively locked when the mobile device moves away from the vehicle and is within a predetermined range of the permissible access boundary.

In another embodiment, when the mobile access device is moving, is within the permissible access zone (e.g., within the range X1 from vehicle, shown in FIG. 6), and is greater than or equal to a predetermined distance (e.g., 1 m) away from the vehicle, the wait period may change at a first rate. When the mobile access device is moving, is within the permissible access zone, and is less than the predetermined distance (e.g., 1 m) away from the vehicle, the wait period may change at a second rate. The first rate may be greater than the second rate. The wait period, when the mobile access device is within the permissible access zone and more than the predetermined distance away from the vehicle, may be less than the wait period when the mobile access device is within the predetermined distance of the vehicle. This may be true when moving toward or away from the vehicle. In another embodiment, the wait periods remain the same when the mobile access device is moving away from the vehicle. As an example, the permissible access zone is represented by X1 in FIG. 6 and the predetermined distance is shown by X2 in FIG. 6. In yet another embodiment, the wait period when the mobile access device is closer than the predetermined distance is set at a maximum wait period, which may be the same as a wait period when the mobile access device is outside a second predetermined distance (e.g., 20 m). As an example, the wait period may be equal to a length of an advertisement period associated with the mobile access device being more than the second predetermined distance away from the vehicle.

Referring to FIGS. 7-8, in one embodiment, the BLE transceiver 706 is not included and/or is not enabled, and advertisement and/or connection signals are not transmitted. UWB signals are transmitted for determining both distances and for sending challenge signals. Wait periods may be determined as described above. In another embodiment, instead of transmitting UWB signals for both distance determination and periodic ranging, LF and/or NFC signals are transmitted, when within a predetermined range (3 m) of the vehicle, to determine distances between the mobile access device 700 and the vehicle. UWB signals are then transmitted for periodic ranging.

Figure 9:
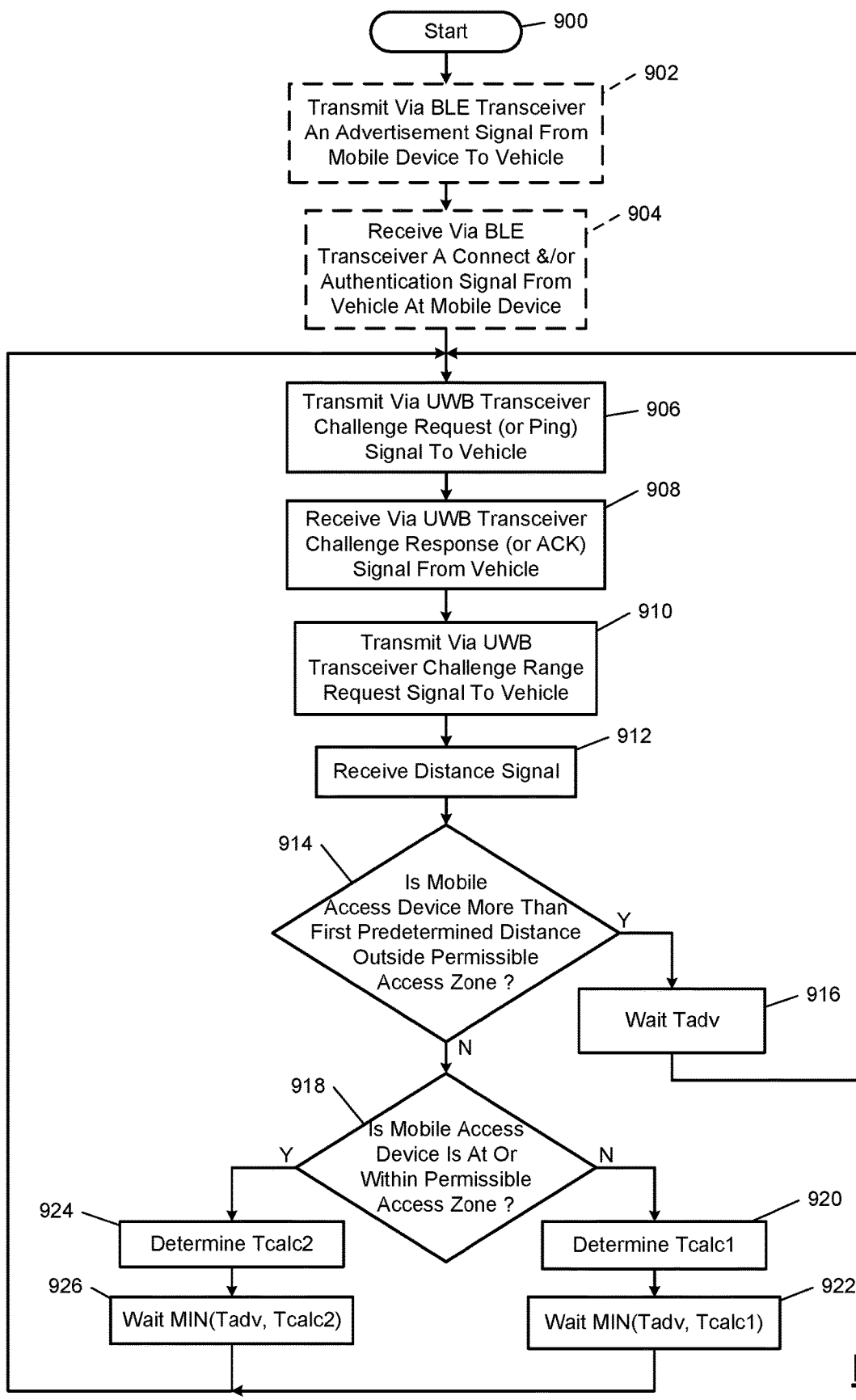
FIG. 9 illustrates a method of operating a mobile access device in accordance with an embodiment of the present disclosure.

FIG. 9 illustrates a method of operating a mobile access device, such as one of the mobile (or portable) access devices disclosed herein. Although the following operations of FIGS. 9-10 are primarily described with respect to the implementations of FIGS. 1-5, the operations may be easily modified to apply to other implementations of the present disclosure. The operations may be iteratively performed. The method of FIG. 9 may be performed while the method of FIG. 10 is being performed. The operations of FIG. 9 may be performed by a control module and/or range module of the mobile access device.

The method may begin at 900. At 902, the mobile access device transmits via a BLE transceiver an advertisement signal to the vehicle. At 904, the BLE transceiver of the mobile access device receives a connect signal and/or an authentication signal from the vehicle. In one embodiment, operations 902 and 904 are not performed.

At 906, the mobile access device initiates a range request exchange and transmits via a UWB transceiver a Ping signal to the vehicle, as described above. At 908, the UWB transceiver of the mobile access device receives an ACK signal as described above from the vehicle.

At 910, the UWB transceiver of the mobile access device transmits a range request signal to the vehicle. At 912, the BLE, UWB, LF or NFC transceiver of the mobile access device receives a distance signal from the vehicle indicating a distance between the mobile access device and the vehicle.

At 914, the control module and/or range module of the mobile access device determines whether the mobile access device is more than a first predetermined distance outside a permissible access (or unlock) zone. If yes, operation 916 may be performed, other operation 918 may be performed. At 916, the control module and/or range module waits a predetermined advertisement period Tadv prior to returning to operation 906.

At 918, the control module and/or range module determines whether the mobile access device is at or within the permissible access zone. If no, operation 920 is performed, otherwise operation 924 is performed.

At 920, the control module and/or range module determines a first wait period Tcalc1. As an example, when the unlock boundary is 3 m, the calculated wait period Tcalc1 may be set equal to: a first wait period (e.g., 1.5 s) if the distance is greater than a first predetermined distance (e.g., 5 m); a second wait period (e.g., 100 milli-seconds (ms)) if the distance is within a predetermined range of the unlock boundary (e.g., 3 m±20 centimeters); and a product of (i) the distance minus the unlock boundary (e.g., 3 m) and (ii) a predetermined constant value (e.g., 1.4) divided by 2 (for a linear formula).

At 922, the control module and/or range module may determine a minimum of the predetermined advertisement period Tadv and Tcalc1 and waits the minimum period prior to returning to operation 906. In one embodiment, when advertising is not performed, the minimum of a predetermined ranging period Rp and Tcalc1 may be determined and the control module and/or range module waits the minimum period. The minimum period refers to which one of Tadv (or Rp) and Tcalc1 is shorter. The predetermined ranging period Rp may be equal to the advertisement period Tadv or may be a different period.

At 924, the control module and/or range module determines a second wait period Tcalc2. As an example, when the unlock boundary is 3 m, the calculated wait period Tcalc2 may be set equal to: a first wait period (e.g., 1.5 s) if the distance is less than a second predetermined distance (e.g., 2 m); a second wait period (e.g., 100 milli-seconds (ms)) if the distance is within a predetermined range of the unlock boundary (e.g., 3 m±20 centimeters); and a product of (i) the unlock boundary (e.g., 3 m) minus the distance and (ii) a predetermined constant value (e.g., 1.4) divided by 2 (for a linear formula).

At 926, the control module and/or range module determines a minimum of the predetermined advertisement period Tadv and Tcalc2 and waits the minimum period prior to returning to operation 906. The minimum period refers to which one of Tadv and Tcalc2 is shorter. In one embodiment, when advertising is not performed, the minimum of the predetermined ranging period Rp and Tcalc2 may be determined and the control module and/or range module waits the minimum period.

Figure 10A:
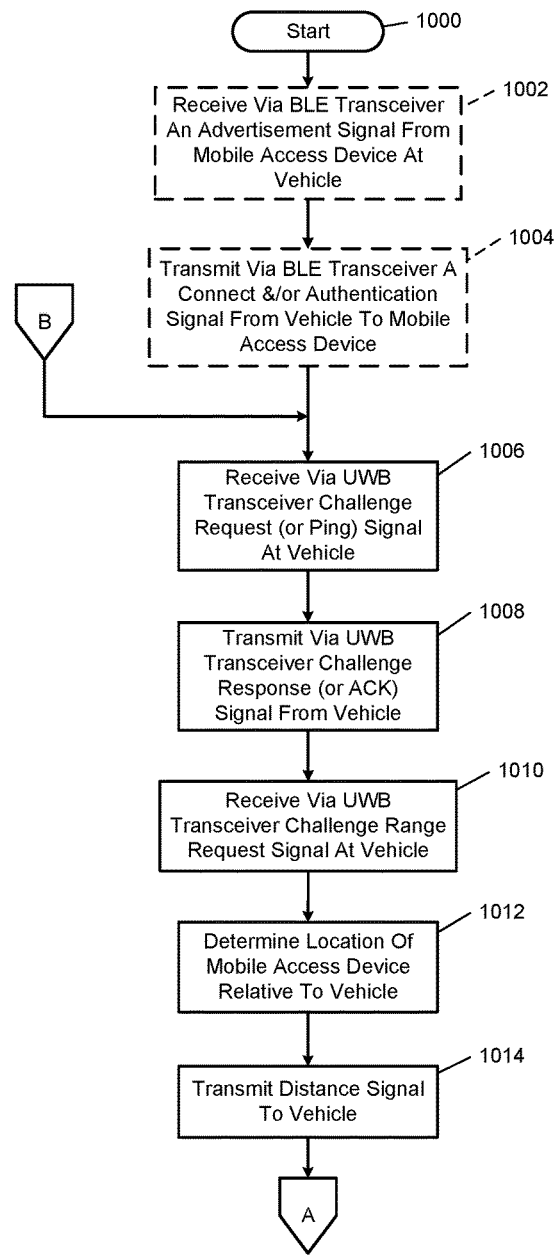
FIGS. 10A and 10B illustrates a method of operating an access system of a vehicle in accordance with an embodiment of the present disclosure.
Figure 10B:
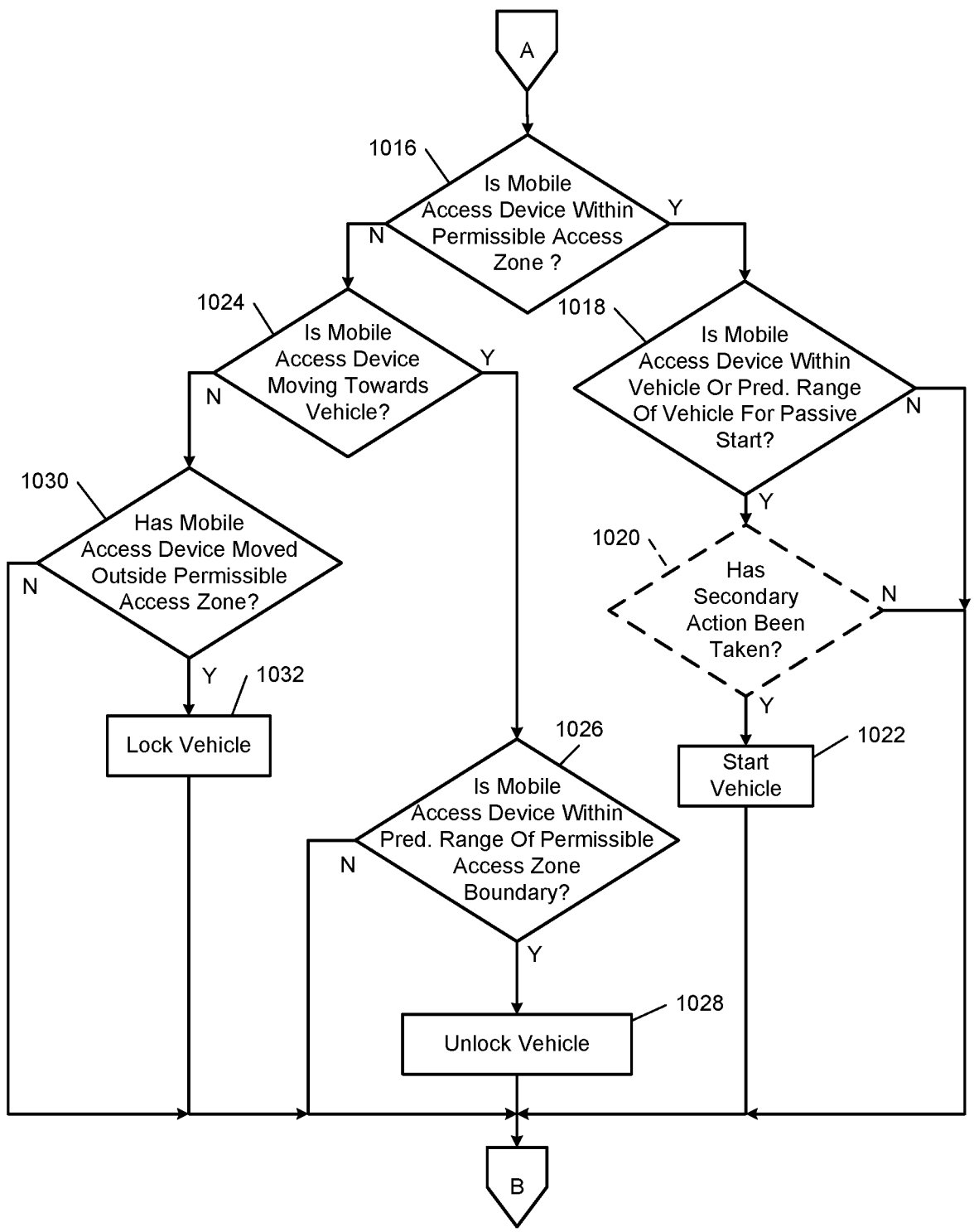

FIGS. 10A and 10B illustrate a method of operating an access system of a vehicle, such as that shown in FIG. 2. The access module and/or range module of the vehicle may perform the below describe operations. The method may begin at 1000. At 1002, the BLE transceiver of the vehicle receives the advertisement signal from the mobile access device. At 1004, the BLE transceiver, in response, transmits the connect signal and/or authentication signal from the vehicle to the mobile access device. In one embodiment, operations 1002, 1004 are not performed.

At 1006, the UWB transceiver receives the Ping signal from the mobile access device. At 1008, the UWB transceiver, in response, transmits an ACK signal to the mobile access device. At 1010, the UWB transceiver may receive a range request signal from the mobile access device. At 1012, the access module and/or range module determines a location of the mobile access device relative to the vehicle and/or a distance between the vehicle and the mobile access device.

At 1014, the access module and/or range module via the BLE transceiver, the UWB transceiver, a LF transceiver or a NFC transceiver transmits a distance signal indicating the distance to the mobile access device. At 1016, the access module determines whether the mobile device is within the permissible access zone. If yes, operation 1018 is performed, otherwise operation 1024 is performed.

At 1018, the access module determines whether the mobile access device is within the vehicle or within a predetermined range of the vehicle for passive start. If yes, operation 1020 may be performed. If operation 1020 is not performed, the access module may proceed to operation 1022 if the answer to operation 1018 is yes, otherwise the access module may return to operation 1006.

At 1020, the access module the access module may determine whether a secondary action has occurred, such as a user touching a door handle, a user pushing a button, a user performing a hand gesture, etc. associated with requesting that the vehicle be started. In one embodiment, a secondary action is not needed to process to operation 1022. If yes, operation 1022 may be performed, otherwise operation 1006 may be performed. At 1022, the access module passively starts the vehicle.

At 1024, the access module determines whether the mobile access device is moving towards the vehicle. If yes, operation 1026 is performed, otherwise operation 1030 is performed. At 1026, the access module determines whether the mobile access device is within a predetermined range of the permissible access zone boundary. If yes, operation 1028 is performed and the access module passively unlocks doors of the vehicle. If no, operation 1006 may be performed.

At 1030, the access module determines whether the mobile access device is moved outside the permissible access zone. If yes, operation 1032 is performed, otherwise operation 1006 is performed, otherwise the access module returns to operation 1006. At 1032, the access module locks doors of the vehicle. Operation 1006 may be performed after operation 1032.

The above-described operations of FIGS. 9 and 10 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above provided examples may be applied in a PEPS UWB/BLE system and used to reduce power consumption in mobile (or portable access) devices and in a vehicle. As another example, when a mobile access device is outside a first boundary (e.g., 20 m) of a vehicle, the mobile access device may advertise presence of the mobile access device at a first predetermined rate. When the mobile access device is within the first boundary of the vehicle and outside a second boundary (e.g., 3 m) of the vehicle and approaching the vehicle, the mobile access device may be wirelessly connected to an access module of the vehicle and at a second rate (i) initiate a range request, and/or (ii) determine a distance between the mobile access device and the vehicle. The second rate being faster than the first rate. The second rate may increase the closer the mobile access device is to the second boundary. When the mobile access device is in the second range and moving away from the vehicle, the second rate may decrease. When the mobile access device is within the second boundary and is approaching the vehicle, the mobile access device may at a third rate (i) initiate a range request, and/or (ii) determine a distance between the mobile access device and the vehicle. The third rate may be less than or equal to the second rate. The third rate may decrease the closer the mobile access device is to the vehicle. The third rate may increase when the mobile access device moves away from the vehicle and is still within the second boundary.

The examples include a control module of a vehicle reporting distance information of mobile access devices and the mobile access devices adapting ranging rates. The disclosed techniques are applicable to mobile access devices with a single radio (or transceiver) or multiple radios. If the mobile access devices are LF or NFC enabled for short-range communication, the mobile access devices may turn off transmission of advertisement and/or connection signals and corresponding radio and simply perform a challenge process as described herein when a user has requested that the system perform an action.

Although the terms first, second, third, etc. may be used herein to describe various distances, boundaries, rates, periods, steps, elements, components, regions, layers and/or sections, these distances, boundaries, rates, periods, steps, elements, components, regions, layers and/or sections should not be limited by these terms, unless otherwise indicated. These terms may be only used to distinguish one distance, boundary, rate, period, step, element, component, region, layer or section from another step, element, component, region, layer or section. Terms such as "first," "second," and other numerical terms when used herein do not imply a sequence or order unless clearly indicated by the context. Thus, a first distance, boundary, rate, period, step, element, component, region, layer or section discussed below could be termed a second distance, boundary, rate, period, step, element, component, region, layer or section without departing from the teachings of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A mobile access device comprising:
   one or more transceivers configured to transmit and receive ultra-wideband signals, wherein the ultra-wideband signals include a first challenge signal, and wherein the one or more transceivers comprise
      a low frequency or near field communication transceiver, and
      an ultra-wideband transceiver; and
   a control module configured to
      transmit via the ultra-wideband transceiver the first challenge signal to a vehicle, wherein the first challenge signal is associated with a passive entry or a passive start operation of the vehicle, based on the first challenge signal, receive a response signal from the vehicle via the ultra-wideband transceiver, determine a first distance between the mobile access device and the vehicle based on the response signal, determine a wait period based on the first distance, determine a second distance between the mobile access device and the vehicle based on transmission of a low frequency or near field communication signal between the mobile access device and the vehicle, determine the wait period based on the second distance, wait a minimum period, wherein the minimum period is a minimum of (i) the wait period and (ii) an advertisement period or a predetermined ranging period, and subsequent to waiting the minimum period, transmit a second challenge signal via the ultra-wideband transceiver to the vehicle to update the first distance between the mobile access device and the vehicle.

2. The mobile access device of claim 1, wherein:
the mobile access device enables only the ultra-wideband transceiver; and
the control module is configured to transmit the first challenge signal, receive the response signal and transmit the second challenge signal via the ultra-wideband transceiver.

3. The mobile access device of claim 2, wherein the control module is configured to disable transmission of at least one of advertisement signals or connection signals.

4. The mobile access device of claim 2, wherein control module is not configured to transmit at least one of advertisement signals or connection signals.

5. The mobile access device of claim 1, wherein the control module is configured to disable transmission of at least one of advertisement signals or connection signals.

6. The mobile access device of claim 1, wherein the control module is not configured to transmit at least one of advertisement signals or connection signals.

7. A mobile access device comprising:
one or more transceivers configured to transmit and receive ultra-wideband signals, wherein the ultra-wideband signals include a first challenge signal, and wherein the one or more transceivers comprise
a first transceiver configured to operate according to a first communication standard, and
a second transceiver configured to operate according to a second communication standard; and
a control module is configured to
transmit via the first transceiver an advertisement signal to a vehicle and in response receive at least one of a connect signal or authentication signal from the vehicle to establish a connection,
when the connection is established, transmit via the second transceiver the first challenge signal to the vehicle;
transmit via the one or more transceivers the first challenge signal to the vehicle, wherein the first challenge signal is associated with a passive entry or a passive start operation of the vehicle,
based on the first challenge signal, receive a response signal from the vehicle via the one or more transceivers,
determine a distance between the mobile access device and the vehicle based on the response signal,
determine a wait period based on the distance,
wait a minimum period, wherein the minimum period is a minimum of (i) the wait period and (ii) an advertisement period or a predetermined ranging period, and
subsequent to waiting the minimum period, transmit a second challenge signal via the one or more transceivers to the vehicle to update the distance between the mobile access device and the vehicle.

8. The mobile access device of claim 7, wherein:
the first transceiver is a Bluetooth® low energy transceiver; and
the second transceiver is an ultra-wideband transceiver.

9. The mobile access device of claim 7, wherein:
the first challenge signal and the second challenge signal are range request signals; and
the first challenge signal indicates the distance.

10. The mobile access device of claim 7, wherein the control module is configured to determine the distance between the mobile access device and the vehicle based on locations of the mobile access device and the vehicle.

11. The mobile access device of claim 7, wherein the control module is configured to:
transmit a ping signal via the second transceiver to the vehicle;
receive an acknowledgement signal from the vehicle via the second transceiver; and
transmit the first challenge signal in response to receiving the acknowledgement signal.

12. The mobile access device of claim 7, wherein the control module is configured to:
wait a first predetermined period before transmitting the second challenge signal when the distance is greater than a first predetermined distance; and
wait the wait period when the distance is less than or equal to the first predetermined distance, wherein the wait period is shorter than the first predetermined period.

13. The mobile access device of claim 12, wherein the control module is configured to if the distance is less than a second predetermined distance, increase the minimum period when the mobile access device is approaching the vehicle and decrease the minimum period if the mobile access device is moving away from the vehicle, wherein the second predetermined distance is less than the first predetermined distance.

14. The mobile access device of claim 13, wherein the control module is configured to:
if the distance is less than the second predetermined distance and greater than a third predetermined distance away from the vehicle, adjust the minimum period at a first rate; and
if the distance is less than the third predetermined distance, adjust the minimum period at a second rate.

15. The mobile access device of claim 13, wherein:
the first predetermined distance refers to an impermissible access zone or lock zone of the vehicle; and
the second predetermined distance refers to a permissible access zone or unlock zone of the vehicle.

16. The mobile access device of claim 13, wherein:
the first predetermined distance is 15-25 m; and
the second predetermined distance is 2-4 m.

17. The mobile access device of claim 13, wherein:
the first predetermined distance is 20 m; and
the second predetermined distance is 3 m.

18. The mobile access device of claim 7, wherein the control module is configured to:
when the distance is greater than a permissible access boundary distance from the vehicle, increase a range request rate if the mobile access device is approaching the vehicle, wherein the range request rate is a rate at which the control module requests an update of the distance from the vehicle, and
decrease the range request rate if the mobile access device is moving away from the vehicle; and
when the distance is less than or equal to the permissible access boundary distance from the vehicle,
reduce the range request rate if the mobile access device is approaching the vehicle, and
increase the range request rate if the mobile access device is moving away from the vehicle.

19. The mobile access device of claim 7, wherein the control module is configured to:
set the wait period equal to a predetermined advertisement period when the distance is greater than a first predetermined distance;
set the wait period equal to a first reduced period when the distance is greater than a second predetermined distance, wherein the first reduced period is shorter than the predetermined advertisement period, and wherein the second predetermined distance is less than the first predetermined distance; and
set the wait period equal to a second reduced period when the distance is within a predetermined range of a third predetermined distance, wherein the second reduced period is shorter than the first reduced period, and wherein the third predetermined distance is less than the second predetermined distance.

20. The mobile access device of claim 7, wherein the control module is configured to:
set the wait period equal to a predetermined advertisement period when the distance is greater than a first predetermined distance;
set the wait period equal to a first reduced period when the distance is greater than a second predetermined distance, wherein the first reduced period is shorter than the predetermined advertisement period, and wherein the second predetermined distance is less than the first predetermined distance; and
set the wait period based on a product of a constant and difference between the distance and a third predetermined distance when the distance is less than or equal to the second predetermined distance, wherein the third predetermined distance is less than the second predetermined distance.

21. The mobile access device of claim 7, wherein the control module is configured to:
set the wait period equal to a predetermined advertisement period when the distance is greater than a first predetermined distance;
set the wait period equal to a first reduced period when the distance is less than a second predetermined distance, wherein the first reduced period is shorter than the predetermined advertisement period, and wherein the second predetermined distance is less than the first predetermined distance; and
set the wait period equal to a second reduced period when the distance is within a predetermined range of a third predetermined distance, wherein the second reduced period is shorter than the first reduced period, and wherein the third predetermined distance is greater than the second predetermined distance and less than the first predetermined distance.

22. The mobile access device of claim 7, wherein the control module is configured to:

set the wait period equal to a predetermined advertisement period when the distance is greater than a first predetermined distance;
set the wait period equal to a first reduced period when the distance is less than a second predetermined distance, wherein the first reduced period is shorter than the predetermined advertisement period, and wherein the second predetermined distance is less than the first predetermined distance; and
set the wait period based on a product of a constant and difference between the distance and a third predetermined distance when the distance is less than or equal to the third predetermined distance, wherein the third predetermined distance is greater than the second predetermined distance and less than the first predetermined distance.

23. An access system comprising:
the mobile access device of claim 7; and
an access module implemented at the vehicle and configured to
receive the advertisement signal and in response transmit the at least one of the connect signal or the authentication signal,
receive the first challenge signal, and
based on the first challenge signal, transmit the response signal to the mobile access device.

24. An access system for a vehicle, the access system comprising:
one or more transceivers configured to transmit and receive ultra-wideband signals, wherein the ultra-wideband signals include a first challenge signal, and wherein the one or more transceivers comprise
a first transceiver configured to operate according to a first communication standard, and
a second transceiver configured to operate according to a second communication standard; and
a control module configured to
receive via the first transceiver an advertisement signal transmitted from a mobile access device and in response transmitting at least one of a connect signal or authentication signal to establish a connection with the mobile access device, and
when the connection is established, receive via the second transceiver the first challenge signal from the mobile access device to the vehicle,
based on the first challenge signal, determine a distance between the mobile access device and the vehicle,
transmit a response signal from the vehicle via the one or more transceivers, wherein the response signal indicates the distance,
passively maintain the vehicle in a locked state while the distance is greater than a predetermined distance, and
passively unlock the vehicle when the distance is less than the predetermined distance and passively maintain the vehicle in an unlocked state while the distance is less than the predetermined distance.

25. The access system of claim 24, wherein:
the one or more transceivers comprise
the first transceiver, which is a Bluetooth low energy transceiver, and
the second transceiver, which is an ultra-wideband transceiver; and
the control module is configured to transmit the response signal via the first transceiver or the second transceiver.

26. The access system of claim 24, wherein:
the one or more transceivers comprise
- the first transceiver, which is a low frequency or near field communication transceiver, and
- the second transceiver, which is an ultra-wideband transceiver; and the control module is configured to transmit the response signal via the first transceiver or the second transceiver.

27. The access system of claim 24, wherein the control module is configured to:
- subsequent to a minimum period, receive a second challenge signal from the mobile access device; and
- update the distance between the mobile access device and the vehicle based on the minimum period, wherein the minimum period is a minimum of a predetermined advertisement period and a wait period, and wherein the wait period is based on the distance.

28. The access system of claim 24, further comprising a plurality of sensors configured to generate a plurality of sensor signals, wherein the control module is configured to:
- based on the plurality of sensor signals, determine whether the mobile access device is at least one of within the vehicle or within a predetermined range of the vehicle; and
- passively start the vehicle when the mobile access device is at least one of within the vehicle or within the predetermined range of the vehicle.

29. The access system of claim 24, further comprising a plurality of sensors configured to generate a plurality of sensor signals, wherein the control module is configured to:
- based on the plurality of sensor signals, determine whether (i) the mobile access device is at least one of within the vehicle or within a predetermined range of the vehicle, and (ii) a secondary action has been taken to passively start the vehicle; and
- passively start the vehicle when (i) the mobile access device is at least one of within the vehicle or within the predetermined range of the vehicle, and (ii) the secondary action has been taken.

* * * * *

UNITED STATES PATENT AND TRADEMARK OFFICE
CERTIFICATE OF CORRECTION

Page 1 of 1

PATENT NO. : 11,230,260 B2
APPLICATION NO. : 16/913627
DATED : January 25, 2022
INVENTOR(S) : Ahmed et al.

It is certified that error appears in the above-identified patent and that said Letters Patent is hereby corrected as shown below:

In the Claims

Column 23, Line 57: In Claim 7, delete "vehicle;" and insert --vehicle,-- therefor Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*